INVENTOR
CURTIS C. BELL,
BY
ATTORNEY.

Feb. 23, 1971 C. C. BELL 3,564,921
TORSIONALLY RESONANT GRAVITY GRADIENT SENSOR
Filed Feb. 2, 1968 3 Sheets-Sheet 3

United States Patent Office 3,564,921
Patented Feb. 23, 1971

3,564,921
TORSIONALLY RESONANT GRAVITY GRADIENT SENSOR
Curtis C. Bell, Inglewood, Calif., assignor to Hughes Aircraft Company, Culver City, Calif., a corporation of Delaware
Filed Feb. 2, 1968, Ser. No. 702,618
Int. Cl. G01r 7/00
U.S. Cl. 73—382                                     8 Claims

ABSTRACT OF THE DISCLOSURE

This is a torsionally resonant sensor for measuring second order gradients of gravitational fields. The sensor consists basically of two rigid mass quadrupoles oriented perpendicularly to each other and connected at their centers by means of a torsionally flexible spring. The sensor is rotated in a gravitational field which produces torques that deflect one quadrupole with respect to the other with restraint applied by the torsion spring. The strength and direction of the gravitational force gradient is determined by measuring the amplitude and phase of the vibrations induced in the mass quadrupoles at twice the rotation frequency through the use of electronic circuitry coupled to a single transducer attached to the torsionally flexible spring.

---

The invention herein described was made in the course of or under a contract or subcontract thereunder with the United States Air Force.

The basic concept of rotating gradient sensors has been described and claimed in United States Patent No. 3,273,397 of Robert L. Forward, which patent is assigned to the assignee of the present invention and the specification of which is incorporated herein by reference. It may be said, in accordance with the teaching of the above-referenced patent, that if a system of proof masses is rotated in the static gravitational field of an object, the gravitational force gradient of this field will induce the dynamic forces on the proof masses with a frequency which is twice the rotation frequency of the system, while inertial effects caused by accelerations of the proof mass mounting structure will induce forces with a frequency at the rotational frequency. The strength and direction of the gravitational force gradient can be determined independently of the inertial forces by measuring the amplitude and phase of the vibrations induced in these proof masses at the doubled frequency.

In the area of gravitational fields, it was found that an embodiment of the force sensing portion of the system described in the above-referenced patent as fabricated in the form of orthogonally crossed X frame exhibited improved dynamic characteristics. However, it was later found that this cruciform design would not be as suitable for terrestrial vertical gradiometer applications because its four arm multiple piezoelectric transducer configuration made is susceptible to the 1g acceleration field of the earth through nonlinearities in the transducers. It should therefore be obvious that a new and novel resonant type gravity gradient sensor that would overcome these disadvantages would constitute an important advancement of the art.

This has now been done in accordance with this invention and accordingly it is an object of the present invention to provide an improved resonant gravity gradient sensor.

It is another object of this invention to provide a torsionally resonant gravity gradient sensor that is not susceptible to the 1g acceleration field of the earth.

It is still another object of the invention to provide a torsionally resonant gravity gradient sensor that assures a single mode of vibration in the system which will be excited by gravitational gradients for accuracy of measurements.

It is yet another object of the present invention to provide a torsionally resonant gravity gradient sensor that allows the use of a single transducer and eliminates the need for matching of transducer elements.

It is still a further object of this invention to provide a torsionally resonant gravity gradient sensor that has the advantage of easier balancing and matching of mechanical components and the use of a single torsional transducer for read out.

These and other objects of the invention are obtained, according to one embodiment of the invention, in a torsionally resonant gravity gradient sensor including two rigid mass quadrupoles oriented perpendicularly to each other and connected at their centers by means of a torsionally flexible spring member. Attached to the torsion spring member is a single transducer that is sensitive to the differential torques placed on the two mass quadrupoles by the second order gradients of gravitational fields through which the mass quadrupoles are rotated.

The invention and specific embodiments thereof will be described hereinafter by way of example and with reference to the accompanying drawings wherein like reference numerals refer to like elements or parts and in which:

FIGS. 1A and B illustrate schematically elevation and plan views, respectively, of an embodiment of the invention;

The analysis of the gravitationally induced forces in the sensor according to the present invention is essentially the same as that for the forces produced in the cruciform type sensor referred to before. The sensor masses see gravitationally induced forces at frequencies which are 1, 2, 3, . . . , etc., times the rotation frequency $\Omega$; the magnitude of the $n$th harmonic is proportional to the $n$th order gradient of the gravitational potential field.

Calculation of the torques on each of the quadrupoles results in cancellation of the fundamental rotation frequency and the third harmonic responses; the second harmonic torques T are found to be $$T = \frac{3GMmr^2}{R^3} \sin 2\Omega t \tag{1}$$

where ($2GM/R^3$) is the radial gradient of the gravitational force field, $m$ is the end mass of the quadrupole, and $r$ is the half-length of the quadrupole. Furthermore, the angular acceleration field produced is given by $$\alpha = \frac{T}{I} = \frac{3GM}{R^3} \frac{mr^2}{2mr^2} \sin 2\Omega t = \frac{3}{2} \frac{GM}{R^3} \sin 2\Omega t \tag{2}$$

where I (the quadrupole inertial) $= 2mr^2$; if the sensor is made torsionally resonant at $2\Omega$, the angular deflection of the quadrupole from its neutral position is given by $$\theta = \frac{\alpha Q}{(2\Omega)^2} = \frac{3GMQ}{8R^3\Omega^2} \sin 2\Omega t \tag{3}$$

where Q is the quality factor of the sensor head and associated electronics.

The angle $\theta$ is extremely small. Surface gradients produced by the earth ($3000 \times 10^{-9}$ sec.$^{-2}$) will produce angular responses of $\approx 5 \times 10^{-8}$ rad in typical torsional sensor designs ($Q=300$, $\Omega=80.6$ rad/sec.), while useful threshold signals of $10^{-9}$ sec.$^{-2}$ produce angular responses of $\approx 10^{-11}$ rad.

In order to transduce this mechanical motion into an electrical signal, various types of signal transducers may be utilized, such as piezoelectric strain transducers, magnetostrictive transducers and capacitive transducers. One of these types of transducers is either directly connected to or made an integral part of the torsional spring member supporting the two mass quadrupoles as seen in FIG. 1, for example.

Figure 1A:
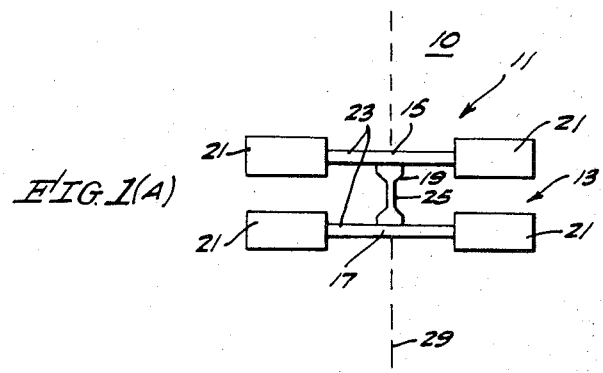
Figure 1B:
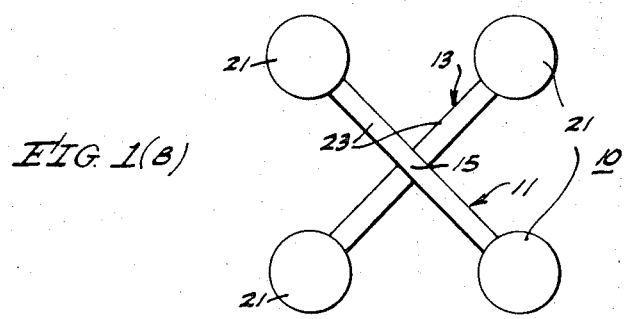

The exemplary embodiment of a gravity gradient sensor shown in FIG. 1 illustrates the application of the above-described concepts.

Here is shown a sensor head 10, a first mass quadrupole 11 and a second mass quadrupole 13 oriented substantially perpendicular to each other and connected at their centers 15 and 17, respectively, by means of a torsionally flexible spring member 19. In the simplified case shown, each mass quadrupole consists of a mass portion 21 attached to each end of an elongated member 23. Attached to the torsion spring member 19 is a single strain transducer 25 positioned so that it is sensitive to the differential torques placed on the two mass quadrupoles 11 and 13 by the second order gradients of gravitational fields through which the mass quadrupoles are rotated about an axis of rotation indicated here by dashed line 29.

Figure 2:
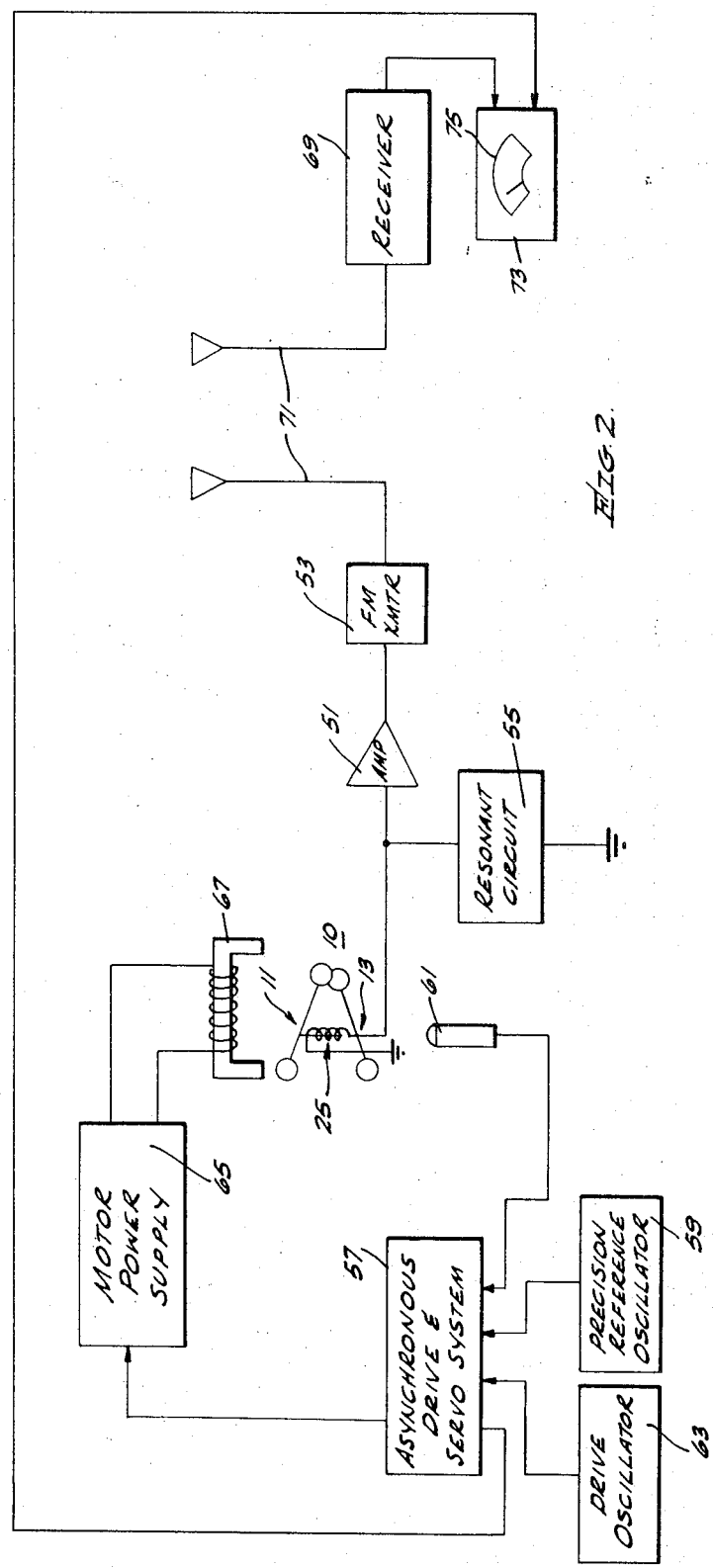
FIG. 2 is a schematic diagram of the electronic circuit useable with the sensor head of the invention.

As can be seen from the block diagram of FIG. 2, an electrical system is shown that operates with the rotating sensor head 10 to provide a complete gravitational gradient sensing system. The sensor head 10 responds to the gradient of the gravitational force field through which it rotates. This response consists of minute torsional oscillations between the mass quadrupoles 11 and 13 at twice the sensor head rotation frequency. These ocillations are detected through the piezoelectric strain transducer 25 affixed to the torsionally flexible spring member 19. The transducer signal is amplified through a low-noise preamplifier 51 and is then used to drive an FM transmitter 53. The low-noise preamplifier 51 is coupled to the transducer 25 in parallel with a resonant tuned circuit 55 tuned to twice the rotation frequency to improve the coupling between the sensor and preamplifier. All of the elements just mentioned may be mechanically carried by and rotate with the sensor head 10 so that undesired interaction between the rotating sensor head 10 and the remainder of the circuitry is minimized. The sensor head and accompanying circuitry may be supported by a conventional air bearing or three-axis magnetic suspension system, not shown, and rotated in an evacuated housing, not shown, to increase the sensitivity of the device by decreasing noise and air resistance, for example.

The sensor head 10 may be rotated at exactly one-half its resonant frequency by means of an asynchronous motor drive and servo system 57 controlled by a precision reference oscillator 59. The sensor head speed is monitored by a conventional photoelectric speed monitor 61 and compared with the oscillator 59 in the asynchronous motor drive and servo system 57. In a manner well known in the art, a drive oscillator 63, also coupled to the asynchronous drive 57, provides voltages that may be adjusted to maintain proper sensor speed through a heavily damped servo control on a motor power supply 65 and stator motor assembly 67 coupled to the asynchronous drive 57.

The speed pick-off signal from the photoelectric speed monitor 61 is also used as a frequency and phase reference for the sensor output signal which has been demodulated in a compatible FM receiver 69 coupled to the transmitter 53 by antennas 71 and fed into a conventional phase sensitive detector 73. Here, the signal is filtered, matched against the reference voltage from the asynchronous drive 57 to provide frequency and phase readings, and time averaged over a specifically chosen time constant. A meter 75 in the detector 73 reads the voltage at the operating frequency, at any phase angle, and over any chosen integration time. The signal amplitude read on the meter indicates the size of the gradient, while signal phase with respect to the speed reference signal indicates the direction of the gradient anomaly.

Figure 3:
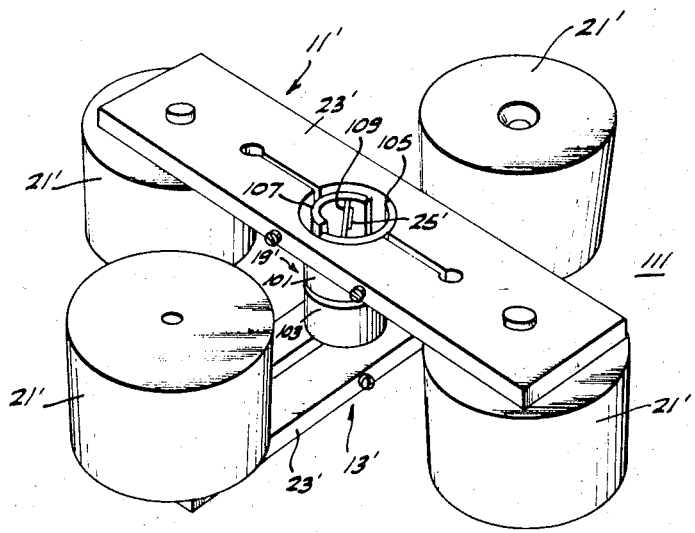
FIG. 3 is a perspective view of sensor head constructed according to another embodiment of the invention.

In another embodiment constructed according to the invention as seen in FIG. 3, a conventional flexural pivot 19' is used as the torsional spring. This pivot comprises a pair of spaced cylinders 101 and 103, each attached to a separate sleeve 105 and 107, respectively, protruding inside but spaced from the other cylinder and between which sleeves a pair of flexible members 109 are attached (only one can be seen in the figure). A strain transducer 25' is affixed to one of the flexural spring members or leaves 109. Here, the sensor head 111 consists of two mass quadrupoles 11' and 13', each supporting on respective elongated arms 23', a pair of seismic masses 21'. The centrally located flexural pivot assembly 19' may be fabricated from non-metallic material to prevent interaction with magnetic gradient fields and the seismic masses 21' may be manufactured from a suspension of tungsten in plastic, maintaining the high density required for low thermal noise and the high electrical resistance needed to eliminate eddy-current noise. Torsional vibration between the two sets of masses produces tensile and compressive strains in the transducer, and a voltage is developed across the transducer to be fed to a preamplifier such as preamplifier 51 of FIG. 2.

Figure 4:
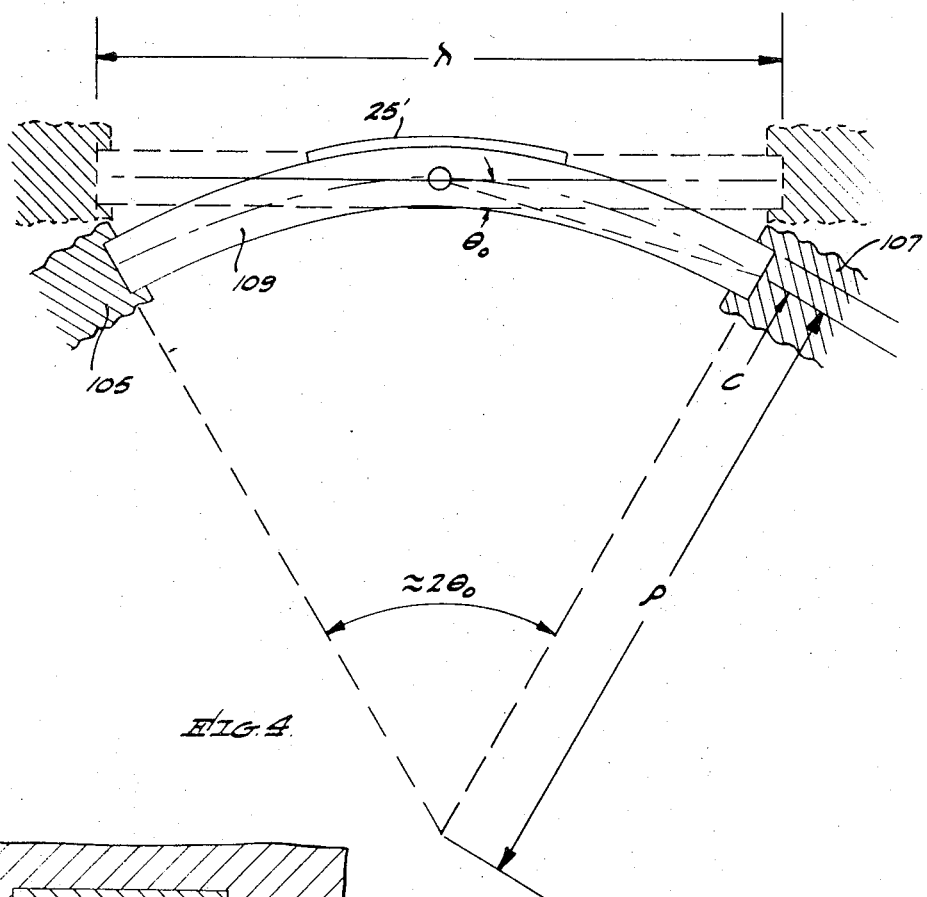
FIG. 4 is a schematic representation of the deflection of one of the spring members in the flexural pivot seen in FIG. 3.

The voltage output from a piezoelectric barium titanate strain transducer 25' affixed to the flexible member 109 of the flexural pivot assembly 19' is easily calculated from basic geometric consideration with reference to FIG. 4. Consider one leaf 109 of a flexural pivot 19' which is being flexed through a total angle $2\theta_0$. The leaf 109 has a length $\lambda$ and a thickness $2c$. When the leaf is fully flexed, it approximates an arc segment of a circle with a radius of curvature $\rho$ (provided $\theta_0$ is very small). If the centerline of the leaf is considered as a neutral section, its length remains $\lambda$ and is unstressed. However, the length of the top surface of the leaf is now $2\theta_0 (\rho+c)$ and the tensile strain at this surface is $$\epsilon = \frac{2\theta_0(\rho+c) - 2\theta_0\rho}{\lambda} = \frac{2\theta_0 c}{\lambda} \quad (4)$$

from (3), however, $$\theta_0 = \frac{3}{2} \frac{GMQ}{R^3 \omega_n^2} \quad (5)$$

where the resonant frequency $\omega_n = 2\Omega$; therefore, $$\epsilon = \frac{3GMQc}{\lambda R^4 \omega_n^2} \quad (6)$$

However (the gauge factor of the transducer is $\sigma g V$/unit strain. Therefore, the voltage output of the sensor is $$V = \frac{3Qc\sigma_g}{\lambda \omega_n^2} \left(\frac{GM}{R^3}\right) V/\text{gauge} \quad (7)$$

where $(2GM/R^3)$ is the radical gravitational force field gradient.

The signal-to-noise energy ratio in a torsionally resonant gradient sensor is given by $$S/N = \frac{I\omega_n^2 \theta_0^2}{2kT} \quad (8)$$

here $kT$ is the thermal energy in the torsionally resonant mode and $I$ is the total sensor head inertia. However, $\theta_0$ has been established as $$\theta_0 = \frac{3}{2} \frac{Q}{\omega_n^2} \frac{GM}{R^3} \quad (9)$$

Combining (8) and (9) and solving for $(GM/R^3)$, therefore, we obtain $$\frac{GM}{R^3} = \frac{2}{3} \frac{(S/N)^{1/2} \omega}{Q} \left(\frac{2kT}{I}\right)^{1/2} \quad (10)$$

$Q = (\tau \omega_n / 2)$ and $I = 4mr^2 = ml^2$, and therefore $$\frac{GM}{R^3} = \frac{4}{3} \frac{(S/N)^{1/2}}{\tau l} \left(\frac{2kT}{m}\right)^{1/2} \quad (11)$$

here $\tau$ is the system integration time, $l$ is the center-to-center length of the quadrupole, $m$ is a single end mass of the quadrupole, and $(GM/R^3)$ is the minimum gradient which can be detected at the specified signal-to-noise ratio.

For an exemplary tersional sensor, $m=200$ g, $l=12.7$ cm., and if it is assumed that $\tau=100$ sec., $S/N=1$, and $kT = 4 \times 10^{-21}$ J $= 4 \times 10^{-14}$ ergs, the threshold thermally limited gradient will be $$\frac{GM}{R^3} = 5.33 \times 10^{-11} \text{ sec.}^{-2} \approx 0.05 \text{ E.U.} \quad (12)$$

This threshold can of course be improved by the use of longer integration times.

Figure 5:
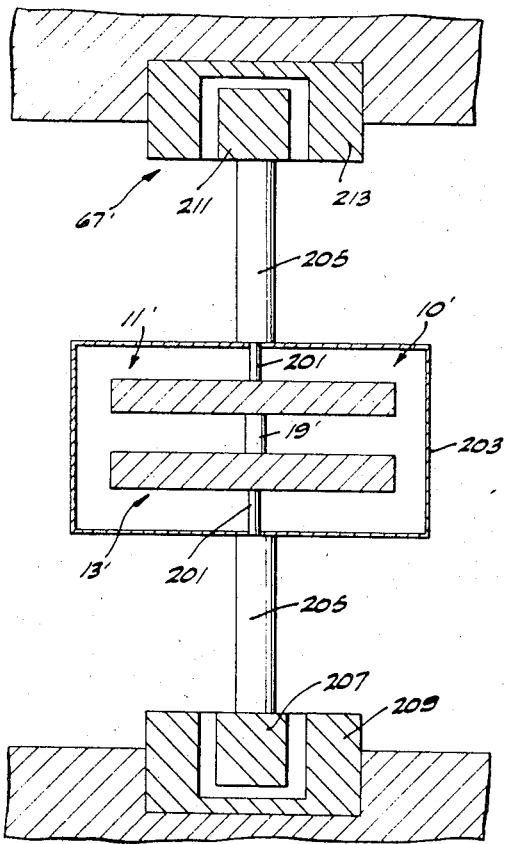
FIG. 5 illustrates an embodiment of the invention wherein the sensor head is supported by two torsional support springs in a sensor housing.

With regard to FIG. 5, there is shown schematically still another embodiment of the invention. Here, a sensor head 10′ similar to the sensor head 10 of FIG. 1 is supported by two torsional support springs 201 in a sensor housing 203. The sensor head 10′ and sensor housing 203 are coupled to a rotating shaft 205 having an end rotor bearing 207 seated in a rotor bearing cup 209 and rotated by means of a motor assembly 67′ comprising a rotor 211 attached to the other end of shaft 205 seated within a stator 213. The bearings at each end of the shaft 205 may be of any conventional low noise type such as air or magnetic bearings.

As can be seen from FIG. 5, the sensor housing 203 surrounds the sensor head 10′ and rotates with it for windage reduction. The housing 203 also acts as a shield to provide electrostatic and electromagnetic shielding for the sensor. In order to reduce internal mechanical noise that may be introduced as the result of deviations in rotational frequency through mismatching in the resonant frequencies of the two support torsional springs, the mass quadrupole inertias may be matched to their individual support springs 201 so that any torque variations produce the same deflection in each of the sensor arms 11′ and 13′ and therefore cancel out.

From the foregoing, it will be seen that there is achieved an improved, simple and accurate torsionally resonant gravity gradient sensor suitable for use portably as a terrestrial vertical gradiometer.

Although specific embodiments have been herein described, it will be appreciated that other organizations of the specific arrangements shown may be made within the spirit and scope of the invention. For example, to improve the dynamic characteristics, the mass quadrupoles of the sensor head may be fabricated in a segment arrangement. Additionally, other similar components or elements may be substituted for those which have been particularly named.

Accordingly, it is intended that the foregoing disclosure and the showings made in the drawings shall be considered only as illustrations of the principles of this invention and are not to be construed in a limiting sense.

What is claimed is:

1. A system for measurement of static gravitational field gradients, comprising:
   a resonant energy storage device including a pair of rigid mass quadrupoles oriented substantially perpendicular to each other and connected at their centers by means of a torsionally flexible spring having a substantially rectilinear axis, said quadrupoles being responsive to gravitational force fields;
   means for imparting equally to said mass quadrupoles a periodic motion, which has a component relative to the axis of the spring, through the gravitational force field being measured to induce in said mass quadrupoles energy in the form of periodically varying signals;
   means including at least one transducer for combining said signals from each of said mass quadrupoles to form a resultant complex signal, the orientation of said mass quadrupoles causing said complex signal to have gradient connoting components at various harmonic frequencies related to the frequency of the periodic motion of said mass quadrupoles through the gravitational force field being measured, said quadrupoles and spring being resonant at a selected component frequency, which is a harmonic of the periodic motion, corresponding to a selected gravitational force gradient and excited thereby to provide a large amplitude response to the selected signal component; and
   output means coupled to said energy storage device and responsive to the large amplitude response for providing an output signal.

2. A system for measurement of static gravitational field gradients according to claim 1, wherein said output means includes an electromechanical transducer attached to said torsionally flexible spring.

3. A system for measurement of static gravitational field gradients according to claim 2, wherein said periodic motion is the rotation of said mass quadrupole, and wherein said output means also includes a low-noise preamplifier coupled to the output terminals of said electromechanical transducer and a radio frequency transmitter coupled to the output terminals of said low-noise amplifier, said transducer and said transmitter both being mounted on said resonant energy storage device and rotate with it.

4. A system for measurement of static gravitational field gradients according to claim 1, wherein said mass quadrupoles are supported by two torsional support springs to reduce torque variations between said mass quadrupoles.

5. A system for measurement of static gravitational field gradients according to claim 4, wherein said mass quadrupoles are supported by said torsional support springs inside a sensor housing.

6. A system for measurement of static gravitational field gradients according to claim 2, wherein said torsionally flexible spring comprises a relatively short metallic rod having a reduced center diameter at which point said electromechanical transducer is attached.

7. A system for measurement of static gravitational field gradients according to claim 2, wherein said torsionally flexible spring comprises a flexural pivot assembly including two spaced cylinders, each attached to separate sleeve members and mechanically coupled to each other by a pair of flexible members upon one of which is attached said electromechanical transducer.

8. A torsionally resonant rotating gravity gradient sensor for use in a system for measurement of static force field gradients, comprising:
   two rigid mass quadrupoles oriented substantially perpendicularly to each other;
   torsionally flexible spring means connecting said mass quadrupoles at the centers thereof for registering torques that deflect one of said mass quadrupoles with respect to the other of said mass quadrupoles as said sensor is rotated in a gravitational field; and
   an electromechanical transducer attached to said torsionally flexible spring to measure the torques therein registered.

References Cited

UNITED STATES PATENTS 2,514,250   7/1950   Meredith _____ 73——505X
3,114,264   12/1963  Williamson _____ 73—382
3,273,397   9/1966   Forward _____ 73—382

JAMES J. GILL, Primary Examiner